3,197,498
ALKYL-(MERCAPTO, SULFOXY, SULFONYL)-ACETIC ACID AMIDE-S-ESTERS OF PHOSPHORUS ACIDS
Walter Lorenz, Wuppertal-Vohwinkel, Hans-Gerd Schicke, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Mar. 27, 1962, Ser. No. 182,976
Claims priority, application Germany, Apr. 8, 1961, F 33,623
4 Claims. (Cl. 260—461)

The present invention relates to and has as its objects new and useful insecticidal phosphoric-, phosphonoc- or phosphinic-acid-esters or their thio-derivatives and processes for the preparation thereof. The new compounds of this invention may be represented by the following general formula

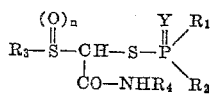

$R_3$ stands, in this formula, for a possibly substituted alkyl or aralkyl residue which is attached to the sulphur atom by a primary, secondary or tertiary carbon atom, or for a possibly substituted aryl residue; $R_1$ and $R_2$ are to stand for residues which, together with the remaining part of the molecule, form a derivative of a phosphoric (-onic, -inic) acid ester or amide, Y stands for oxygen or sulphur, $n$ is 0, 1 or 2, and $R_4$ stands for hydrogen or a lower aliphatic residue, which can be straight or branched, an aralkyl or possibly substituted aryl residue.

Phosphoric acid ester derivatives of the general formula

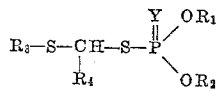

wherein $R_1$ and $R_2$ are aliphatic hydrocarbon residues, $R_3$ a possibly substituted alkyl or aralkyl residue, which is attached to the sulphur atom by a primary or secondary carbon atom, $R_4$ is the group —$COOR_5$, —$CON(R_6R_7)$ or —C≡N, and wherein $R_5$, $R_6$ and $R_7$ represent low molecular aliphatic hydrocarbon residues, and Y means an oxygen or sulphur atom, are already known from German patent specification No. 1,068,699. In this specification it is expressly stated that while $R_4$ can stand for the group —$CO.N(R_6R_7)$, these radicals $R_6$ and $R_7$ must both be low molecular aliphatic hydrocarbon residues.

In accordance with this invention it has now been found that compounds of the above first formula:

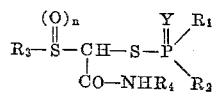

have a far better biological effect than the compounds of German patent specification No. 1,068,699.
(The symbols in this formula have the same significance as given above).

The production of the compounds according to this invention takes place in a manner known in principle, by, for example, the reaction of an α-halo-α-alkyl-(aralkyl, aryl)-mercapto-acetic acid monoalkyl(aralkyl-aryl) amide (I) with salts of thiono-thiol- or thiolphosphoric (-onic, -inic) acids (II), preferably in the presence of inert solvents.

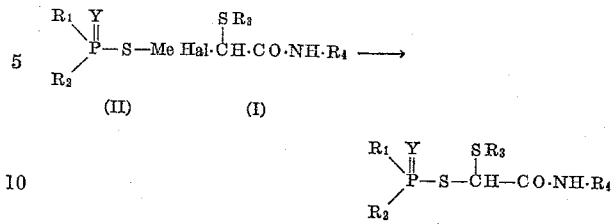

Inert solvents are, for example, water, ketones, alcohols, chlorinated hydrocarbons, acetonitrile and the like. The reaction is preferably carried out at a temperature between about 0–30°. The esters obtained are either crystalline compounds or highly viscous, non-distillable liquids.

Subsequently they can be oxidised with hydrogen peroxide, nitric acid, potassium permanganate, whereby compounds of the sulphoxide or sulphone type are formed, i.e. compounds of the type wherein $n$ is 1 or 2.

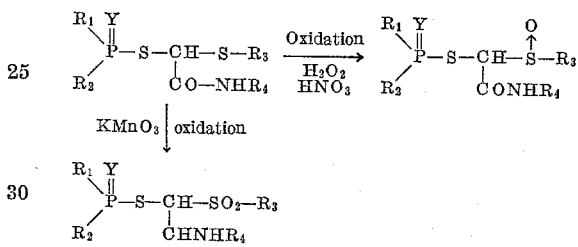

The class of α-halo-α-alkyl-(aryl, aralkyl)-mercapto-acetic acid amides necessary as starting materials is known and obtained e.g. by the halogenation of suitable alkyl (aralkyl, aryl)-mercapto-acetic acid amides, which themselves are known to be obtainable e.g. by the reaction of alkyl (aralkyl, aryl)-mercapto-acetic acid halides with suitable primary alkyl-, aralkyl or arylamines or from suitable mercaptans wtih the corresponding chloroacetic acid amides in the presence of an acid-binding agent.

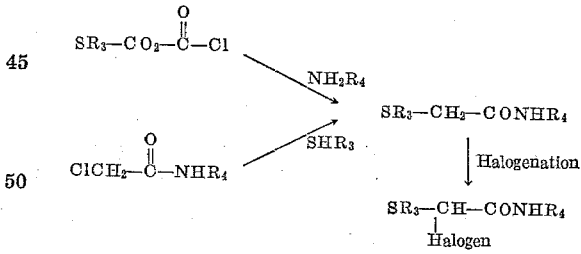

The claimed compounds are to serve as plant protecting agents for combating sucking and eating insects and for combating ecto- and endoparasites on warm-blooded animals.

They also very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

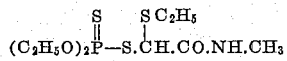

has been tested against flies and aphids. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against flies (*Musca domestica*). About 50 flies are placed under covered petri dishes in which drip wet filter papers have been placed which were sprayed drip wet with an insecticidal solution of a concentration as shown below. The living status of the flies has been determined after 24 hours. The following results have been obtained: Flies were killed completely with 0.0001% solutions.

(b) Against aphids (contact-insecticidal action) of the type *Doralis fabae*. Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained: Aphids were killed completely with 0.0001% solutions.

Some of the claimed compounds are also distinguished by a systemic action.

The process according to the invention may be illustrated by way of the following examples:

*Example 1*

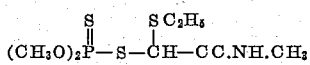

67 g. (0.4 mol) of α-chloro-α-ethylmercapto-acetic acid methylamide (unknown from the literature, not distilled) are added dropwise to suspension of 77 g. (0.44 mol) of the ammonium salt of dimethyl dithiophosphoric acid in 200 cc. of acetone. The temperature thereby rises to 35° C., some cooling taking place, if necessary. After stirring for half an hour at room temperature, the mixture is poured into water, rendered neutral with potassium carbonates and seeded. The precipitated oil solidifies. It is filtered off with suction and pressed on clay. From benzene/petrol ether there are obtained fine white needles of M.P. 112° C. Yield: 80 g., i.e. 69.2% of the theoretical.

$C_7H_{16}O_3NS_3P$—Calc.: N, 4.84%; P, 10.71%; S, 33.24%; M.W.=289.4. Found: N, 4.87%; P, 10.41%; S, 33.15%.

The $LD_{50}$ on rats per os lies at 10 mg./kg. Caterpillars are killed completely with 0.01% solutions. Flies are kiled completely with 0.1% solutions. Aphids are killed completely with 0.01% solutions. Spider mites are killed completely with 0.01% solutions. Systemic action with aphids on oats (*Sitobium granarium*) 0.1% solution= 100% killing. The compound shows an ovicidal action against spider mites.

By the same way there may be obtained the compounds of the following formulae

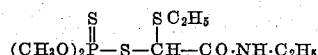

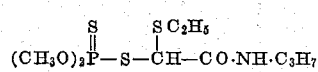

*Example 2*

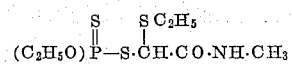

To a solution of 83 g. (0.44 mol) of the ammonium salt of diethyl dithiophosphoric acid in 200 cc. of acetone there are added dropwise at 30° C., with occasional cooling, 67 g. (0.4 mol) of α-chloro-α-ethylmercapto-acetic acid methylamide. After subsequent stirring for half an hour, the mixture is poured into water, neutralised with sodium bicarbonate, seeded and the rapidly solidifying oil filtered off with suction. From benzene/petrol ether there are obtained colourless crystals of M.P. 95° C. Yield: 100 g.=78.7% of the theoretical.

$C_9H_{20}O_3NS_3P$—Calc.: N, 4.41%; S, 30.30%; P, 9.76%; M.W.=317.4 Found: N, 4.52%; S, 30.29%; P, 10.11%.

The mean toxicity on rats per os lies at 2 mg./kg. Caterpillars are killed completely with 0.1% solutions. Flies are killed completely with 0.0001% solutions. Aphids are killed completely with 0.0001% solutions. Spider mites are killed completely with 0.001% solutions. Systemic action with aphids on oats (*Sitobium granarium*) 0.1% solution=10% killing. The compound shows as ovicidal action against spider mites.

*Example 3*

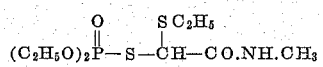

To a solution of 80 g. (0.44 mol) of the ammonium salt of diethyl thiolphosphoric acid in 200 cc. of acetone there are added dropwise at 30° C., with slight cooling, 67 g. (0.4 mol) of α-chloro-α-ethylmercapto-acetic acid methylamide. The mixture is further stirred for half an hour at room temperature, filtered off with suction from the precipitated ammonium chloride and the solvent distilled off in a vacuum. The residue is suspended in water, the oil taken up in benzene and washed once with a sodium bicarbonate solution. After drying over sodium sulphate, the solvent is distilled off, and 85 g. of a viscous, red-brown oil are obtained, which is not distillable. Yield: 70.8% of the theoretical.

$C_9H_{20}O_4NS_2P$—Calc.: N, 4.65%; S. 21.28%; P, 10.28%; M.W.=301.4. Found: N, 4.42%; S, 20.66%; P, 10.04%.

The $DL_{95}$ on rats per os lies at 1 mg./kg. Caterpillars are killed completely with 0.01% solutions. Flies are killed completely with 0.01% solutions. Aphids are killed completely with 0.001% solutions. Spider mites are killed completely with 0.001% solutions. Systemic action with aphids on oats (*Sitobium granarium*) 0.1% solution= 100% killing.

The compound shows an ovicidal action against spider mites.

*Example 4*

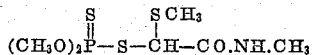

97 g. (0.55 mol) of the ammonium salt of dimethyl dithiophosphoric acid are suspended in 250 cc. of acetone. There is added dropwise thereto a solution of 78 g. (0.5 mol) of α-chloro-α-methylmercapto-acetic acid methylamide in 50 cc. of acetone. The exothermic reaction is kept at 30° C. by cooling. After further stirring for half an hour at room temperature, the mixture is poured into water. The rapidly solidifying oil is filtered off with suction, washed with water and recrystallised from ether/benzene. Colourless crystals of melting point 84° C. Yield: 87 g. i.e. 63.3% of the theoretical.

$C_6H_{14}O_3NS_3P$—Calc.: N, 5.09%; S, 34.94%; P, 11.25%; M.W.=275.3. Found: N, 5.40%; S, 34.57%; P, 11.10%.

Caterpillars are killed completely with 0.01% solutions. Flies are killed completely with 0.1% solutions. Aphids are killed completey with 0.01% soutions. Spider mites are killed completely with 0.01% solutions. Systemic action with aphids on oats (*Sitobium granarium*) 0.1% solution=100% killing. The compound shows an ovicidal action against spider mites.

*Example 5*

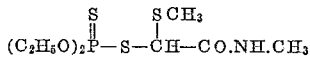

A solution of 78 g. (0.5 mol) of α-chloro-α-methylmercapto-acetic acid methylamide in 50 cc. of acetone is added dropwise, with cooling, at a maximum of 30° C. to a solution of 112 g. (0.5 mol) of the ammonium salt of diethyl dithiophosphoric acid in 250 cc. of acetone. The solution is stirred for a further half an hour at room temperature, poured into water and the rapidly solidifying oil filtered off with suction. From ether there are obtained heavy, colourles crystals of melting point 85° C. Yield: 118 g., i.e. 78.3% of the theoretical.

$C_8H_{18}O_3NS_3P$—Calc.: N, 4.62%; S, 31.70%; P, 10.21%; M.W.=303.4. Found: N, 4.30%; S, 32.01%; P, 10.25%.

Caterpillars are killed completely with 0.1% solutions. Flies are killed completely with 0.1% solutions. Aphids are killed completely with 0.01% solutions. Spider mites are killed completely with 0.001% solutions. Systemic action with aphids on oats (*Sitobium granarium*) 0.1% solution=100% killing. The compound shows an ovicidal action against spider mites.

*Example 6*

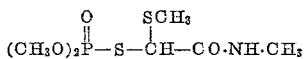

To a suspension of 88 g. (0.555 mol) of the ammonium salt of dimethyl thiolphosphoric acid in 200 cc. of acetone there is added dropwise a solution of 73 g (0.466 mol) of α-chloro-α-methylmercapto-acetic acid methylamide in 50 cc. of acetone. The temperature thereby rises from 15° C. to 30° with the separation of ammonium chloride. After stirring for a further half an hour, the salt is filtered off, and the solvent is distilled off. The residue is taken up in about 100 cc. of water, neutralised with sodium bicarbonate and salted out with sodium sulphate. The oil salted out from the aqueous solution is taken up in methylene chloride and the salt solution again shaken with methylene chloride. The combined methyl chloride solutions are dried over sodium sulphate. After distilling off the solvent, there are obtained 50 g. of a water-miscible red oil. Yield 41.5% of the theoretical.

$C_6H_{14}O_4NS_2P$—Calc.: N, 5.40%; S, 24.73%; P, 11.95%; M.W.=259.3. Found: N, 5.10%; S, 24.65%; P, 11.35%.

Caterpillars are killed completely with 0.1% solutions. Aphids are killed completely with 0.01% solutions. Spider mites are killed completely with 0.01% solutions. The compound shows an ovicidal action against spider mites.

By oxidation with equimolecular amounts of hydrogen peroxide (30%) in 50 parts of alcohol/water (1:1) at room temperature there is obtained the corresponding sulfoxide

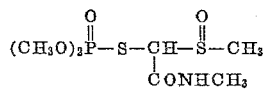

With the calculated amount of KMnO₄ in 20 parts of acetone/water (1:1) at 0–5° C. there is obtained the corresponding sulfone

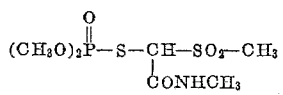

*Example 7*

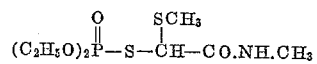

As in the previous example, 73 g. (0.466 mol) of α-chloro-α-methylmercapto-acetic acid methylamide and 124 g. (0.555 mol) of the ammonium salt of diethyl thiolphosphoric acid are reacted. By suitable working up of the reaction mixture, there are obtained 93 g. of a water-miscible red oil which is not distillable. Yield 69.8% of the theoretical.

$C_8H_{18}O_4NS_2P$—Calc.: N, 4.88%; S, 22.32%; P, 10.78%; M.W.=287.3. Found: N, 4.67%; S, 22.49%; P, 10.38%.

Caterpillars are killed completely with 0.01% solutions. Flies are killed completely with 0.1% solutions. Aphids are killed completely with 0.01% solutions. Spider mites are killed completely with 0.001% solutions. Systemic action with aphids on oats (*Sitobium granarium*) 0.1% solution=100% killing. The compound shows an ovicidal action against spider mites.

*Example 8*

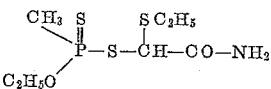

Into a solution of 61 g. (0.315 mol) of the potassium salt of methane thiono-thiolphosphoric acid ethyl ester in 120 ml of acetonitrile there are given 44 g. (0.285 mol) of α-chloro-α-ethylmercaptoacetic acid amide. The reaction temperature rises to about 35° C. Stirring is continued over night at room temperature. After addition of 250 ml. of water the oil which separates is taken up in benzene, washed twice with water and dried over sodium sulfate. After distilling off the solvent there remain 65 g. of a light brown oil. Yield: 83.5% of the theoretical.

$C_7H_{16}O_2NS_3P$—Calculated: N, 5.12; S, 35.18; P, 11.34. Found: N, 5.08; S, 35.11; P, 10.97.

LD₅₀ on rates per os 2.5 mg./kg. Caterpillars and aphids are killed completely with 0.01% solutions. Flies are killed to 100% with 0.1% solutions. Spider mites are killed to 100% with 0.001% solutions. The compound also shows an ovicidal action. Systemic action with 0.1% solutions, 100% killing.

*Example 9*

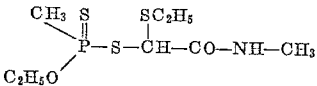

To a solution of 53.4 g. (0.33 mol) of the potassium salt of methane thiono-thiolphosphonic acid ethyl ester in 150 cc of acetone there are added dropwise at 20° C. 51 g. (0.3 mol) of α-chloro-α-ethylmercapto acetic acid methyl amide dissolved in 50 cc. of acetone. The reaction is exothermic and the temperature while cooling is not allowed to rise above 35° C. After stirring for half an hour at room temperature 250 cc. of water are added. The crystallizing oil is filtered off with suction, washed with water and dried in the air. Yield: 55 g. (63.8% of the theoretical). From benzene/petrol ether there is obtained the ester in form of colourless crystals of M.P. 98° C.

$C_8H_{18}O_2NS_3P$—Calculated: N, 4.87; S, 33.46; P, 10.78. Found: N, 4.91; S, 33.24; P, 10.88.

LD₅₀ on rates per os 1.25 mg./kg. Caterpillars, flies and aphids are killed completely with 0.01% solutions. Spider mites are killed with 0.001% solution to 95%. The compound shows an ovicidal action. Systemic action with 0.1% solutions=100%.

By oxidation with hydrogen peroxide or potassium permanganate (according to Example 6) there are obtained the corresponding sulfoxide and sulfon of the above compound.

Example 10

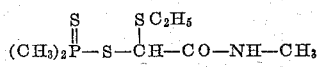

To a solution of 54 g. (0.33 mol) of the potassium salt of dimethyl-dithiophosphinic acid in 150 cc. of acetone there are added 51 g. (0.3 mol) of α-chloro-α-ethyl-mercapto acetic acid methyl amide, dissolved in 50 cc. of acetone while cooling. The temperature is not allowed to rise above 35° C. Stirring is continued for half an hour at room temperature and the solution is then poured into 250 cc. of water. The oily reaction product crystallizes. After recrystallization from acetonitrile there are obtained colorless raw crystals from M.P. 146° C. Yield: 40 g. (51.8% of the theoretical).

$LD_{50}$ on rats per os 500 mg./kg. Caterpillars are killed completely with 0.1% solutions.

We claim:
1. A compound of the formula

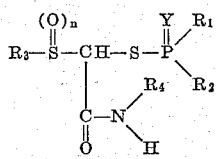

wherein $R_1$ and $R_2$ stand for members selected from the group consisting of lower alkyl having up to 4 carbon atoms and lower alkoxy having up to 4 carbon atoms, $R_3$ stands for lower alkyl having up to 4 carbon atoms, $R_4$ stands for a member selected from the group consisting of hydrogen and methyl, Y stands for a chalkogen of an atomic weight less than 40 and $n$ stands for an integer between 0 and 2.

2. The compound according to claim 1 wherein $R_1$ and $R_2$ are lower alkoxy and $R_4$ is methyl.

3. The compound of the following formula

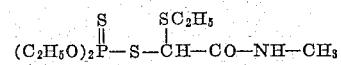

4. The compound of the following formula

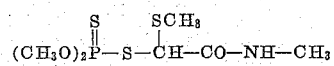

References Cited by the Examiner

UNITED STATES PATENTS

| | | | |
|---|---|---|---|
| 2,494,283 | 1/50 | Cassaday et al. | 260—461 |
| 2,815,312 | 12/57 | Schuler | 260—461 |

CHARLES B. PARKER, *Primary Examiner.*

MORRIS LIEBMAN, *Examiner.*